Feb. 18, 1941. C. E. GIBSON 2,232,321
MEAT TENDERIZER
Filed Feb. 24, 1940

C. E. Gibson
INVENTOR.
BY *CA Knowles*
ATTORNEYS.

Patented Feb. 18, 1941

2,232,321

UNITED STATES PATENT OFFICE 2,232,321

MEAT TENDERIZER

Carlos E. Gibson, Los Angeles, Calif.

Application February 24, 1940, Serial No. 320,647

2 Claims. (Cl. 30—304)

This invention relates to meat tenderizers, the primary object of the invention being to provide a meat tenderizer wherein the tough fibers of the meat under treatment, will be cut without disturbing the cellular structure of the meat, thereby tenderizing the meat in a manner to preserve the original flavor, which is usually lost when meat is tenderized by the well known beating method.

An important object of the invention is to provide a tenderizer of this character having means for regulating the depth of operation of the blades of the tenderizer.

Another object of the invention is to provide a handle for the tenderizer which will completely house the blades of the device when the device is out of use, thereby insuring against a person cutting himself by contact with the blades of the tenderizer.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
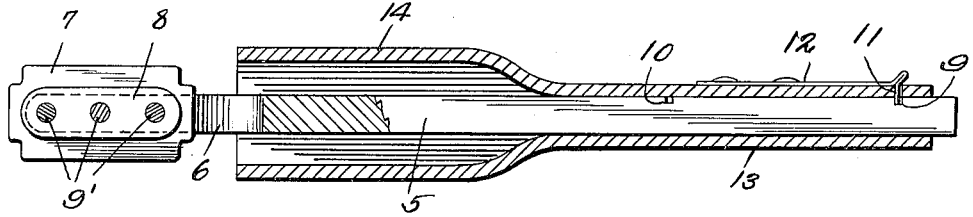
Figure 1 is a longitudinal sectional view through the tenderizer, the blade support of the tenderizer being shown as extended for use.

Referring to the drawing in detail, the device comprises a bar 5 formed with a forked end 6 which supports the blades of the tenderizer. These blades are indicated by the reference character 7 and as shown, are held in spaced relation with respect to each other by means of the spacer bars 8. The blades and spacer bars being provided with openings for the reception of the bolts 9' that are shown as extended through the spacer bars and blades, holding the blades together.

The bar is formed with transversely disposed grooves 9 and 10 in the upper surface thereof, the grooves adapted to receive the downwardly extended end 11 of the spring 12, thereby holding the bar in various positions of adjustment with respect to the handle of the housing or casing.

Figure 2:
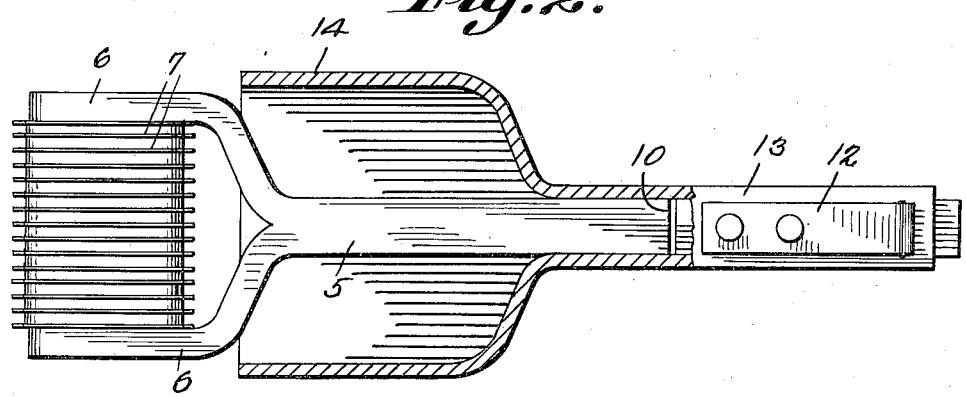
Figure 2 is a longitudinal sectional view taken at right angles to Figure 1.
Figure 3:
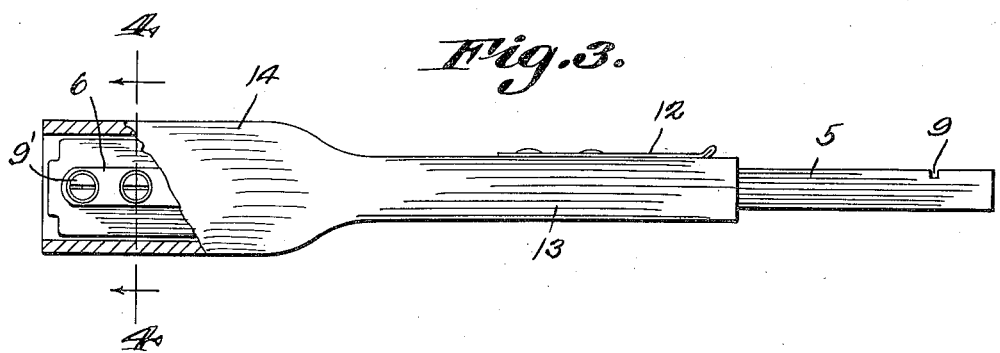
Figure 3 is an elevational view partly broken away illustrating the position of the blades of the device when they are out of use.
Figure 4:
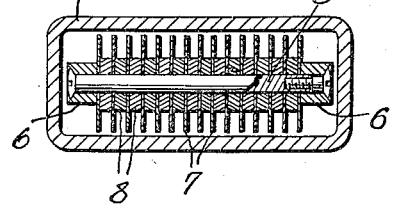
Figure 4 is a sectional view taken on line 4—4 of Figure 3.

The casing comprises a hollow handle section 13 and a wide end 14, the wide end 14 being of a construction to completely house the forked end 6 of the bar 5, together with the blades supported thereby. When it is desired to use the meat tenderizer, the bar 5 is moved to the position shown by Figures 1 and 2 of the drawing, whereupon the bar is held in position by means of the member 12.

From the foregoing it will be seen that the members 8 will act as gauges to prevent the blades from passing too far into the meat, to destroy the cellular structure of the meat.

In the use of the device, the blades are moved across the surface of the meat and then the device is again moved across the surface of the meat at right angles with respect to the cuts formed by the first action of the blades. The meat is reversed, and the opposite side thereof is treated in a like manner.

It might be further stated that the handle portion is hollow and rectangular in formation to conform to the cross section of the bar 5. With this construction, it will be obvious that the bar together with the blades supported thereby will be held against movement with respect to the handle or casing when in use.

What is claimed is:

1. A meat tenderizer comprising a bar having a wide end, a plurality of blades mounted at the wide end of the bar and disposed in parallel spaced relation with each other, a hollow casing in which the bar moves, said casing having a wide end and adapted to receive the wide end of the bar and blades carried thereby, said bar adapted to slide to a position exposing the blades, and means for holding the bar against movement with respect to the casing.

2. A meat tenderizer comprising a bar having a wide forked end, a plurality of blades mounted on the wide end between the tines of the forked end, a casing embodying a wide end and a narrow contracted portion, said bar adapted to extend into the contracted end of the casing, and said blades adapted to move into the wide portion of the casing completely encasing the blades when out of use.

CARLOS E. GIBSON.